United States Patent [19]
Timm et al.

[11] Patent Number: 5,988,844
[45] Date of Patent: Nov. 23, 1999

[54] METHOD FOR ARRANGING A FUZZY CONTROLLER OR A SYSTEM OF INTERLINKED FUZZY CONTROLLERS

[75] Inventors: Klaus Timm, Wentorf; Ralf Bergholz, Braunschweig; Hubert Weisser, Lehre, all of Germany

[73] Assignee: Volkswagen AG, Wolfsburg, Germany

[21] Appl. No.: 08/859,636

[22] Filed: May 20, 1997

[30] Foreign Application Priority Data

Jun. 20, 1996 [DE] Germany .............................. 196 24 614

[51] Int. Cl.$^6$ .................................................. G05B 15/00
[52] U.S. Cl. .................................. 364/131; 706/8; 706/52
[58] Field of Search .................................... 706/900, 1, 2, 706/4, 52, 8; 364/131, 424.05; 62/176.3; 395/3; 376/252

[56] References Cited

U.S. PATENT DOCUMENTS

| | | | |
|---|---|---|---|
| 5,345,776 | 9/1994 | Komazaki et al. | 62/176.3 |
| 5,459,816 | 10/1995 | Basehore et al. | 395/3 |
| 5,483,450 | 1/1996 | Titli et al. | 364/424.05 |
| 5,517,537 | 5/1996 | Greene et al. | 376/252 |
| 5,655,056 | 8/1997 | Tasaka | 395/3 |

FOREIGN PATENT DOCUMENTS

| | | |
|---|---|---|
| 4241920 | 6/1994 | Germany . |
| 4308194 | 9/1994 | Germany . |
| 4439505 | 5/1996 | Germany . |

OTHER PUBLICATIONS

"Distance Control on Vehicles with Fuzzy Control"by Holve et al.

H.–P. Preuss and J. Ookel, "Lernverfahren für Fuzzy–Regler" (Learning procedure for fuzzy control), "atp" *Automatisierungstrechnische Praxis 37* (1995), 7.

Chi–Cheng Jou, "Supervised Learning in Fuzzy System: Algorithmus and Computational Capabilities," *Proceedings of the Second IEEE International Conference on Fuzzy Systems*, San Francisco, Mar. 28–Apr. 1, 1993, Vol. 1, pp. 1–6.

B. G. Song et al., "Adaptive Membership Function Fusion and Annihilation in Fuzzy If–Then Rules," Ibid. Vol. II, pp. 962–967.

B. Demaya et al., "Multilevel Qualitative and Numerical Optimization of Fuzzy Controller," *Proceedings of the International Conference on Fuzzy Systems, International Joint Conference of the 4th IEEE International Conference on Fuzzy Systems and the 2nd International Fuzzy Engineering Symposium*, Yokohama, Mar. 20–24, 1995, pp. 1149–1154.

*Primary Examiner*—William Grant
*Assistant Examiner*—Victoria Robinson
*Attorney, Agent, or Firm*—Baker & Botts, L.L.P.

[57] ABSTRACT

A method is disclosed for arranging or adapting a fuzzy controller or of a system of interlinked fuzzy controllers having at least two input variables and an output variable which controller or system has input membership functions with which truth values of linguistic values for the input variables are determined, and has a control mechanism in which truth values for the output variable are determined from the truth values for the input variable and has output membership functions with which the values of the output variable are determined from the truth values for the output variable. Pursuant to the method, value ranges are defined for the input variables and a number of classes are determined over the value ranges. Subsequently, in a learning phase, value combinations of the input variables and of the output variable are recorded data set by data set. The defined classes are altered, removed and/or new classes are generated as a function of the registered value combinations. Following the completion of the class adaptation, adapted membership functions and the rules of the fuzzy controller are set up on the basis of the newly formed classes.

25 Claims, 6 Drawing Sheets

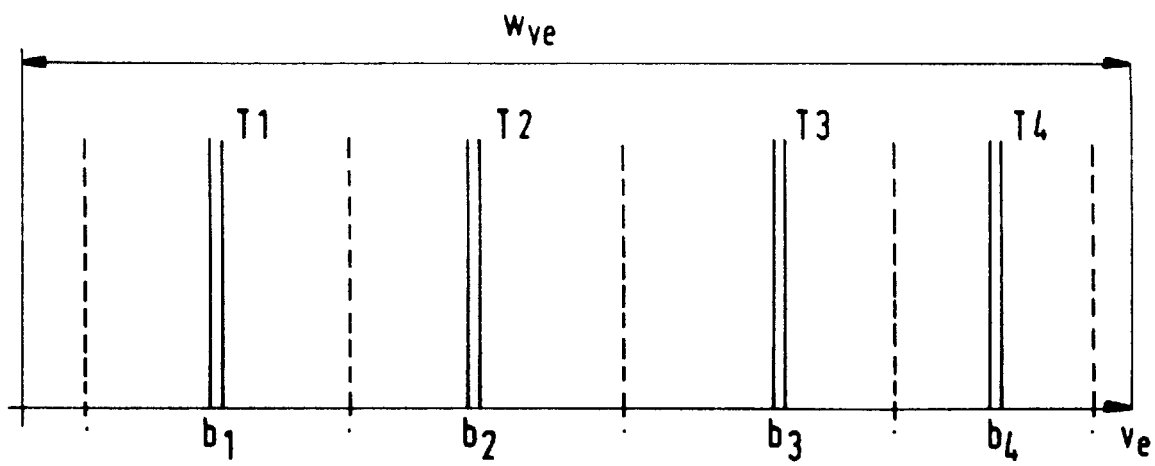
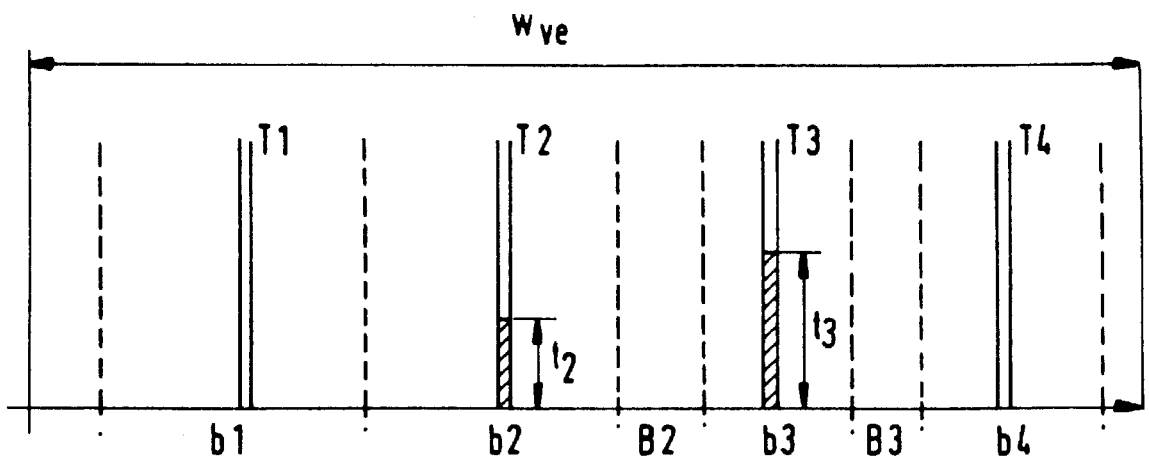

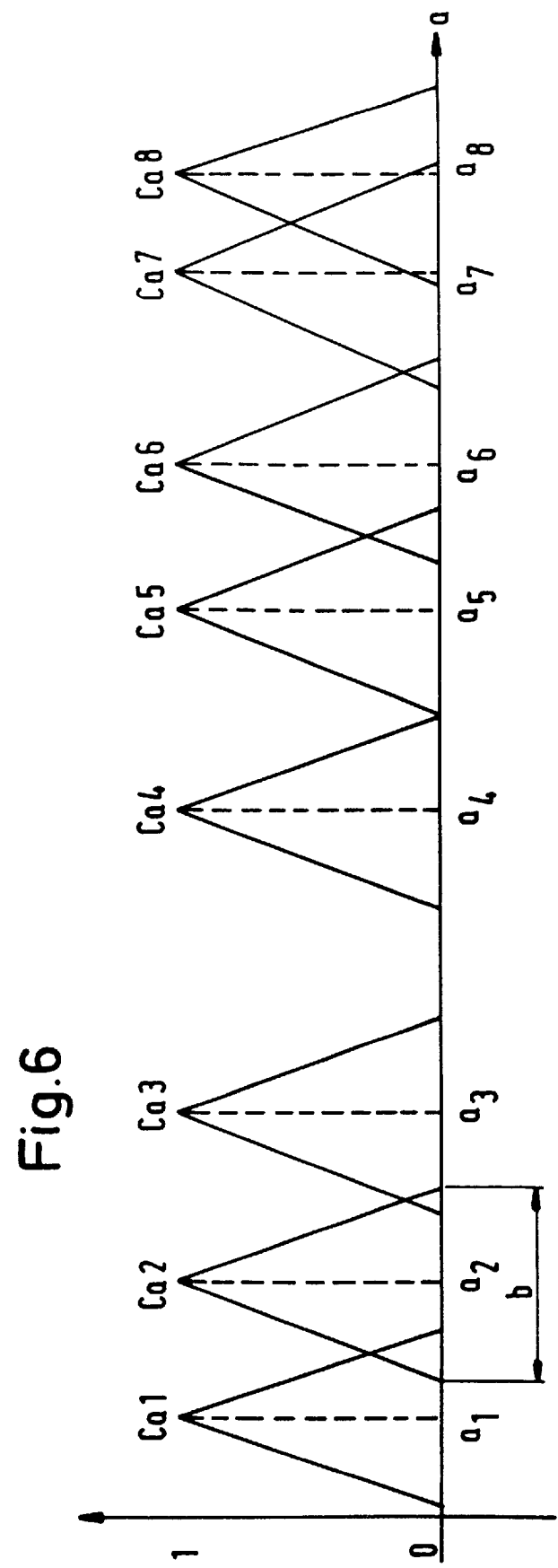

METHOD FOR ARRANGING A FUZZY CONTROLLER OR A SYSTEM OF INTERLINKED FUZZY CONTROLLERS

BACKGROUND OF THE INVENTION

This invention relates to methods for arranging or adapting fuzzy controllers or a system of interlinked fuzzy controllers having at least two input variables and an output variable in which the controller or system has input membership functions with which truth values of linguistic values for the input variables are determined, has a control mechanism in which truth values for the output variable are determined from the truth values for the input variables, and has output membership functions with which the values of the output variable are determined from the truth values for the output variable.

Fuzzy controllers are used when process-specific strategies based on experience, which may be formulated in everyday speech as IF-THEN rules, are to be embodied in algorithms which are capable of being automated. As is known from numerous publications, fuzzy controllers constitute nonlinear, multivariable characteristic map controllers whose static transfer properties depend essentially on the number, position and shape of the membership functions and on the formulation of the linguistic control mechanism. The multiplicity of input variable results in a considerable amount of randomness in the knowledge-based setting-up of fuzzy controllers. Right from the setting of the objective, it is obvious that the design of a fuzzy controller differs fundamentally from that of a conventional controller. Parametric process models and mathematically safeguarded controller design methods are at the foreground of conventional control technology and fuzzy controllers are primarily concerned with the operationalization of such available knowledge.

The normal procedure in the conversion of available knowledge to algorithms is that, following the definition of the input and output variables of the fuzzy controllers, a fuzzy partitioning of the numerical values by means of linguistic values and a positioning of the membership functions for the input and the output variables is carried out. This is followed by the formulation of the expert knowledge as IF-THEN rules and the selection of a suitable defuzzification method. If the necessary expert knowledge is not available, methods for fuzzy controller design or adaption must be used.

In the publication "Lernverfahren fur Fuzzy-Regler", [Learning methods for fuzzy controllers], Automatisierungstechnische Praxis 37 (1955) 7, pages 10–20, a learning process for fuzzy controllers using a classification based on measurement data sets is described. The basis for the method is a classifying statement for the extraction from fuzzy controllers of data sets which in each case consists of an output variable and the associated input variables. According to the basic idea, all data sets constitute elementary rules, the data distribution determines the position of the membership functions and the elementary rules of greatest relevance define the final control base. The membership functions for the input and output variables are initially assumed to be given in the known method. All values from an exemplary data set are fuzzified using the membership functions and are categorized or classified in accordance with their degree of membership. By interlinking the degrees of membership according to the Min operation of fuzzy logic, rules of different relevance are formed. In the process, all those terms which have a degree of satisfaction greater than 0 are taken into account.

The disadvantage of this iterative method is in particular that the memory requirement is very high, since the value combinations of the input and output variables over the entire duration of the adaptation are needed and the adaptation itself lasts for a very long time.

SUMMARY OF THE INVENTION

Accordingly, it is an object of the present invention to provide a method for arranging a fuzzy controller or a system of fuzzy controllers which overcomes disadvantages of the prior art.

Another object of the invention is to provide a method for arranging a fuzzy controller or adapting an existing fuzzy controller or a system of interlinked fuzzy controllers, in which reference does not necessarily have to be made back to existing membership functions and which has a minimum memory requirement in relation to iterative methods.

These and other objects of the invention are attained by defining, in a first step, value ranges for the selected input variables and, in the adaptation of an existing fuzzy controller, reference may be made for this step back to the value ranges covered by the input membership functions. In a second step, a number of classes for the input variables is selected over the defined value range. This selection can be carried out arbitrarily in the position or in the number of the input variables. For the adaptation of an existing controller, however, the selection of classes can also follow the position and/or number of the existing classes of input sets.

Next, in a learning phase, value combinations for the input variables and for the output variable are processed by data set. In order to shorten the learning phase, the value combinations for the input variables and the output variable can be preselected so that measured data which are not decisive for the control are excluded during the adaptation or the design. In a further step the classes selected in the second step are altered or removed and/or new classes are generated as a function of the value combinations. After completing the class adaptation, the adapted membership functions and the rules of the fuzzy controller are set up.

During the adaptation of an already existing fuzzy controller, when selecting the classes in the second method step, reference can be made back to the already available input membership functions of the input variables. According to an advantageous embodiment of the invention, the classes are selected at reference points of the sets of the input membership functions, as a result of which the number of selected classes corresponds to the number of input sets.

With the selection of the classes over the value range of the input variables, at the same time points of intersection of an output variable of the classes in the characteristic map are formed, and these at once form the rules of the fuzzy controller and also the sets of the output membership function.

Moreover, provision can be made to define, for specific ranges, an input variable and/or a value of the output variable which remains constant even during the adaptation or the design of the new membership functions.

During the selection of the new classes as a function of the value combinations of the input variables and of the output variable, a new class is preferably formed upon the occurrence of a value combination which does not fall into any existing class. In a further embodiment, areas are defined around the classes in the value range of the input variables in which areas no new classes are selected, the value combinations of the input variables and of the output variable which fall into one of the areas containing none of the classes are distributed to the adjacent classes in accordance with a weighting, and the areas surrounding these classes are altered in width in accordance with the heights of value combinations thus generated. This produces free areas in which, when a value combination arrives, a new class is formed.

Following the generation of a new class, according to a preferred embodiment, an existing class is removed, with the result that the number of classes remains constant. When deciding which class is removed, the widest range of factors may play a part, for example the hit rate in one class as a result of value combinations of the input variables and of the output variables already registered. When a class is removed, the value combinations of the input and the output variables already assigned to it are distributed to the adjacent classes in accordance with a weighting, preferably in the ratio of their distance over the value range of the input variables to the class to be removed. In addition, if appropriate, the adjacent classes are altered in accordance with the value combinations of the input variables and of the output variable assigned to them.

For the generation of the new sets of the input membership functions on the basis of the newly formed classes, each class preferably forms at least one reference point of an input membership function. For the method according to the invention it is not necessarily required to cover the entire value range of the input variables by registered value combinations of the input variables and of the output variable. For such value ranges and also value ranges having classes of extremely prominent output variables at the point of intersection with classes of other input variables, a local and/or global interpolation can be carried out.

According to the invention, the value combinations of the input variables and of the output variables are determined during an operator manipulation, that is to say during operation by a person, with the aim of replacing the person, in particular if there is no mathematical model or sensing mechanism with measuring errors.

The advantage of the method according to the invention is that it permits an arrangement or an adaptation of a fuzzy controller or of a system of interlinked fuzzy controllers to a system which is subject to severe fluctuations of the input variables and hence expands the possible uses of fuzzy controllers. In addition, in the case of the method according to the invention, in contrast to iterative methods, no reference back to existing knowledge is necessary during the learning phase. Furthermore, it is stable in relation to measuring errors and noise-affected value combinations of input variables with an output variable. The method according to the invention is particularly suitable for fuzzy controllers of small size, for example for fuzzy controllers having two input variables, the fuzzy controllers being able to be interlinked with one another to form a system.

BRIEF DESCRIPTION OF THE DRAWINGS

Further objections and advantages of the invention will be apparent from a reading of the following description in conjunction with the accompanying drawings, in which:

FIGS. 3, 4a, 4b, 5 and 6 are schematic representations showing the method according to a representative embodiment of the invention for the arrangement of a fuzzy controller.

DESCRIPTION OF PREFERRED EMBODIMENTS

Figure 1:
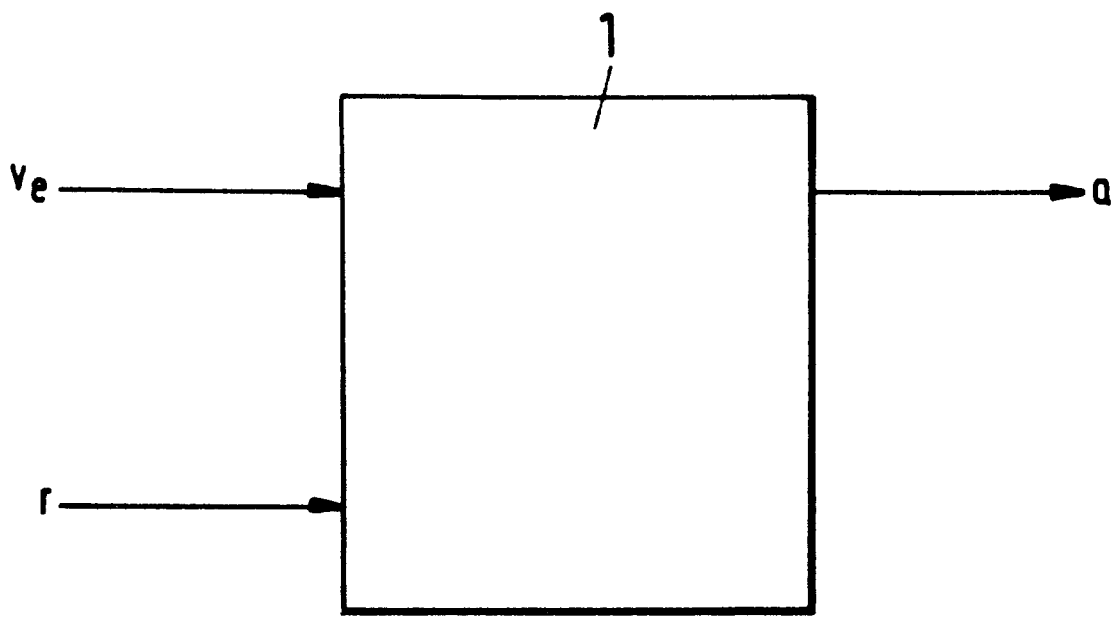
FIG. 1 is a schematic diagram illustrating a fuzzy controller.

In the typical embodiment of the invention illustrated in FIG. 1, a fuzzy controller 1 is provided for the maintenance of the spacing between a motor vehicle containing the controller and another motor vehicle traveling in front of it. An arrangement of fuzzy controllers for this purpose is described in detail in the copending application of the same inventors Ser. No. 08/859,634, filed May 20, 1997. In this case, the speed of the motor vehicle $v_e$ and the prevailing road friction r constitute the input variables to the fuzzy controller, and the spacing a to be maintained constitutes the output variable. The spacing a to be maintained depends not only on the two physical variables, the motor vehicle speed $v_e$ and the road friction r, but also to a large extent on the driving characteristics of the vehicle driver. A vehicle driver who drives in a sporty manner will make full use of the physical limits allowed to him. A vehicle driver who drives somewhat defensively will prefer to keep a large spacing a from a motor vehicle traveling in front. Consequently, for a spacing control arrangement to be acceptable, it is important that the fuzzy controller 1 can be adjusted to the driving characteristics of the particular driver of the motor vehicle.

Figure 2:
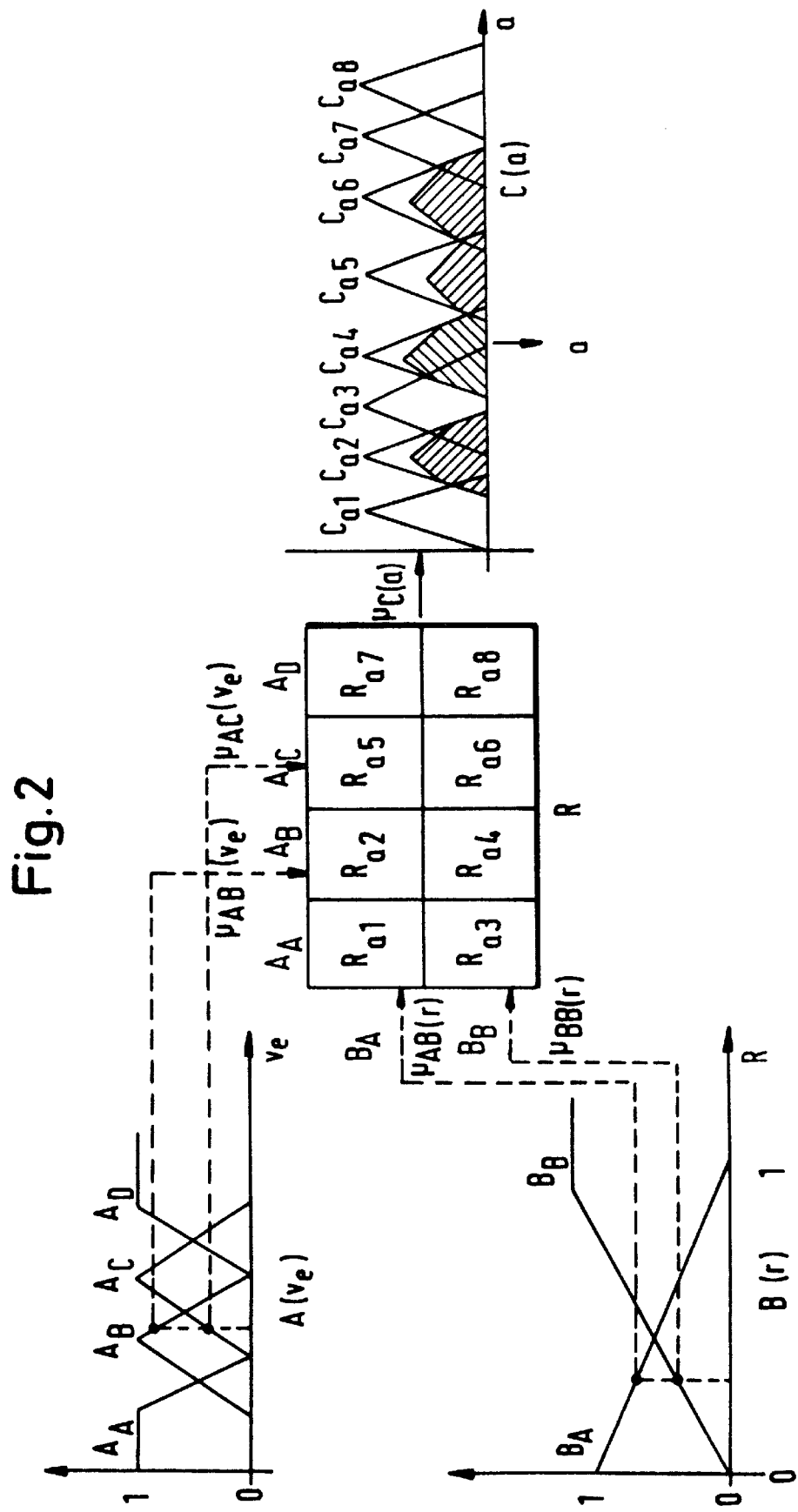
FIG. 2 is a schematic diagram showing the structure of a representative embodiment of the fuzzy controller.

FIG. 2 shows a representative arrangement of the fuzzy controller 1 which comprises input membership functions $A(v_e)$ and $B(r)$, a control mechanism R and output membership functions $C(a)$. By using the input membership functions $A(v_e)$ and $B(r)$, the measured input variables, i.e., the vehicle speed $v_e$ and the friction r, are fuzzified, that is to say truth values $\mu_{AB}(v_e)$ and $\mu_{AC}(v_e)$ and $\mu_{AB}(r)$ and $\mu_{BB}(r)$ are formed. In the control mechanism R, the truth values $\mu_{AB}(v_e)$ $\mu_{AC}(Ve)$ $\mu_{AB}(r)$ and $\mu_{BB}(r)$ are logically combined using the rules $R_{a1}$–$R_{a8}$ and truth values $\mu_c$ for the spacing a are thus formed, from which the values of the output variable a are formed by using the output membership functions $c(a)$.

In contrast to a conventional output membership function, the output membership function $C(a)$ according to the invention has a number of fuzzy sets $C_{a1}$–$C_{a8}$, which may correspond to the number of rules $R_{a1}$–$R_{a8}$, the width of all the fuzzy sets being constant and their reference points, i.e. peaks, being formed by the output value of a rule. The value of the output variable a to be controlled is determined by the usual formation of a center of gravity.

Figure 3:
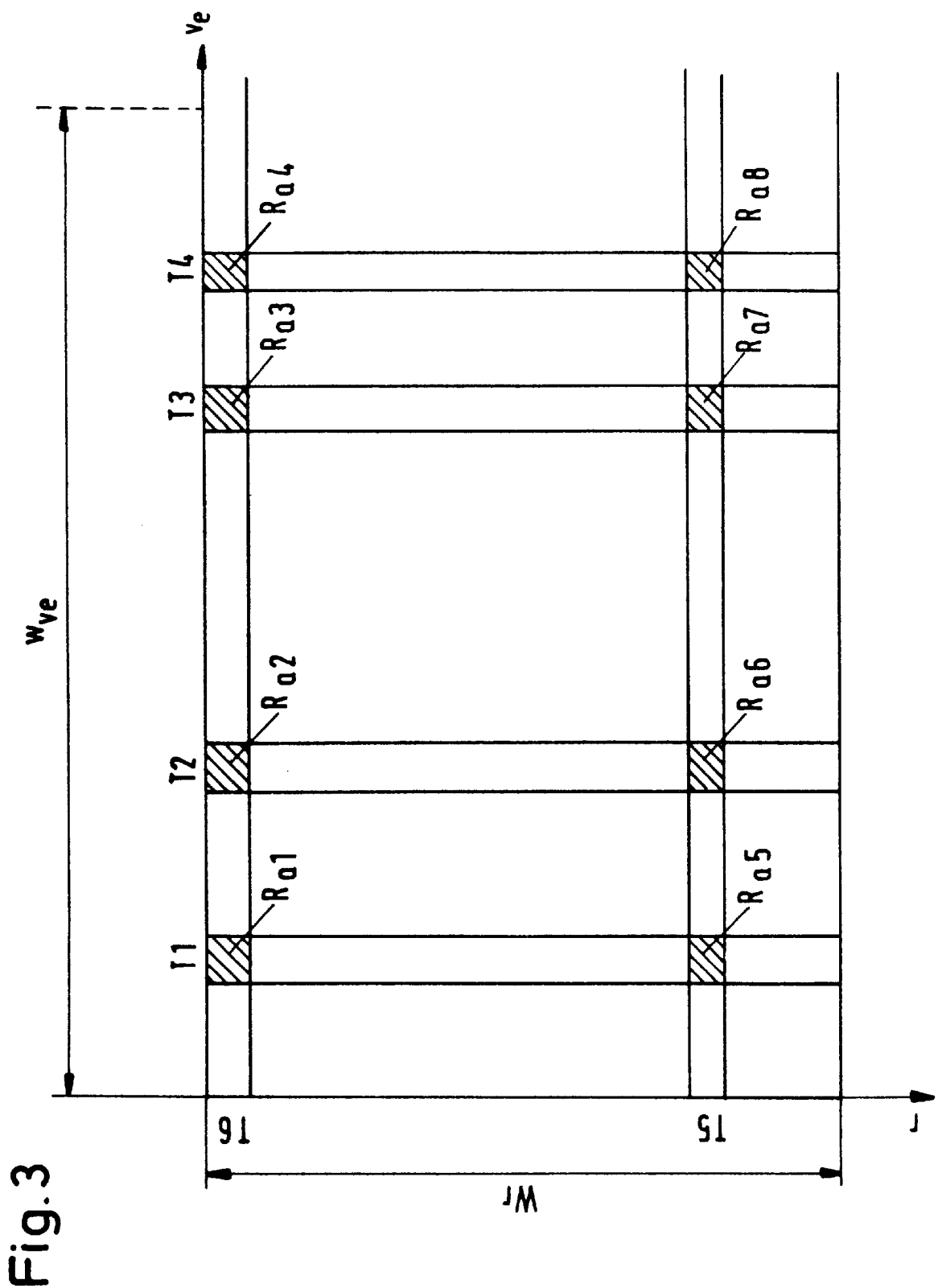

FIGS. 3–6 illustrate a representative example of the design of the fuzzy controller 1 with reference to the input variables vehicle speed $v_e$ and prevailing friction r. As shown in FIG. 3, following the definition of the input variables $v_e$ and r for the fuzzy controller, their value ranges $W_{ve}$ and $W_r$ are determined. For the vehicle speed $v_e$, the range is determined by the possible driving speed range of the motor vehicle. For the friction r the range is from 0 and 1.

Subsequently, four classes T1–T4 are defined arbitrarily over the speed value ranges $w_{ve}$ of the vehicle speed $v_e$ and two classes T5 and T6 are defined arbitrarily over the friction value r range $w_r$, the number of these classes agreeing with the envisaged number of input membership functions $A(v_e)$, $B(r)$ as shown in FIG. 2. In this case, expert knowledge can be relied upon in that the classes T1–T6 are placed at points in the ranges $w_{ve}$ and $w_r$ having a decisive effect on the future system behavior.

The points of intersection $R_{a1}$–$R_{a8}$ of a specific output variable of the classes T1–T4 of the input variable $v_e$, together with the classes T5 and T6 of the input variable r, in this case form first rules of the fuzzy controller as well as the reference points of the sets of the output membership functions, but are not realistic because of the arbitrary arrangement of the classes. Moreover, an inalterable value for the output variable spacing a to the other motor vehicle traveling in front is determined for the initial areas of the value ranges $w_{v_e}$ and $w_r$. This is a minimum value below which the spacing may not fall during travel of the motor vehicle.

During the learning or design phase of the fuzzy controller, that is to say during the manual driving of the motor vehicle by a vehicle driver, value combinations of the vehicle speed $v_e$, of the prevailing road friction r, and of the spacing a are recorded data set by data set and it is determined whether these value combinations fall into one of the classes T1–T4; T5 and T6. At the same time, before the use of the incoming value combination $v_e$, r and a, a selection may be carried out with the result that value combinations occurring in specific driving situations, for example an overtaking procedure, are not used for the adaptation or the design. The classes are altered, removed and/or new classes are formed in accordance with the incoming value combinations. One possible way of forming classes is represented in FIGS. 4a and 4b using the input variable $v_e$.

As also shown in FIG. 3, in a first step the classes T1–T4 are defined arbitrarily over the value range $w_{v_e}$ of the input variable. Formed around these classes are areas $b_1$–$b_4$, defined by dash lines in FIGS. 4a and 4b, in which, if value combinations of the input variables and of the output variable arrive in the learning phase, no new classes may be formed. The arriving value combinations are, however, distributed to the adjacent classes (for example T2 and T3) in accordance with a weighting. Depending on the hit rate thus generated, e.g. $t_2$ and $t_3$ in FIG. 4b, the areas $b_2$ and $b_3$ surrounding the classes T2 and T3 are altered such that free areas B2 and B3 are produced in which new classes are formed if a value combination of input variables and output variables arrives. When forming a new class, an existing class is advantageously removed. At the time of deciding which class is to be removed, the number of hits resulting from the value combinations, for example, plays a part. At the time of removing a class, the information, i.e. the hit rate, already assigned to it is distributed to the adjacent classes in the ratio of their distance in the value range $w_{v_e}$ or $w_r$ from the removed class, and the adjacent classes are altered in accordance with the information assigned to them.

Figure 5:
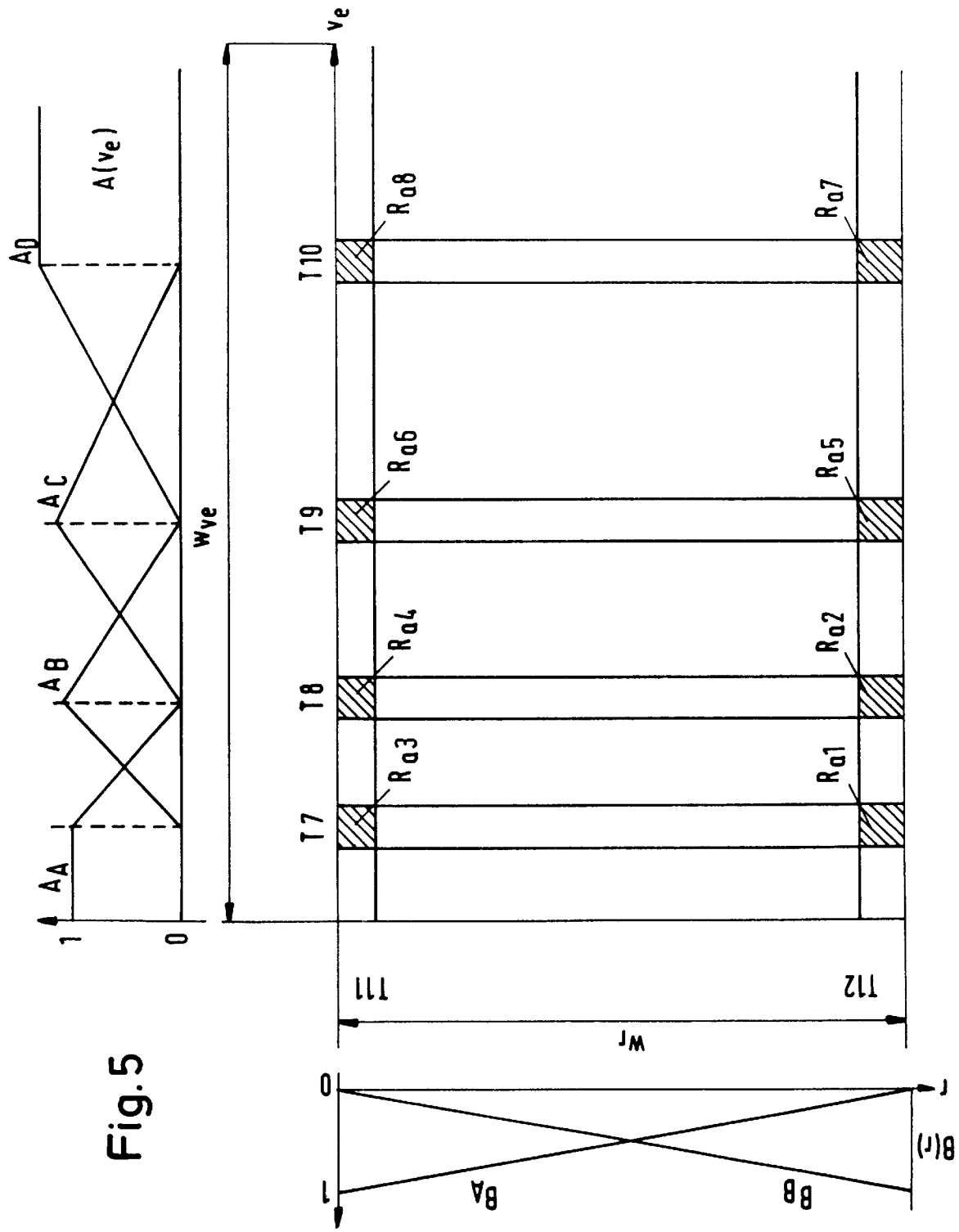

FIG. 5 shows an example of the new classes T7–T10, formed on the basis of the value combinations $v_{v_e}$, r and a registered during the learning phase, over the value range of the vehicle speed $v_e$, and of the classes T11 and T12 over the value range of the road friction r. The sets $A_A$–$A_D$ of the input membership function $A(v_e)$ for the vehicle speed $v_e$ are formed on the basis of the newly formed classes T7–T10, and the sets $B_A$ and $B_B$ of the input membership function $B(r)$ for the friction r are formed on the basis of the classes T11 and T12, each class forming at least one reference point of a set.

A shown in FIG. 6, the points of intersection $R_{a1}$–$R_{a8}$ of an output variable $a_1$–$a_8$ of the classes T7–T10, and the classes T11 and T12, simultaneously yield, in addition to the rules of the fuzzy controller, the reference points of the sets $C_{a1}$–$C_{a8}$ of the output membership function $C(a)$ over the values $a_1$–$a_8$ of the spacing a assigned to them, the sets in principle having the same width b as well.

Although the invention has been described herein with reference to specific embodiments, many modifications and variations therein will readily occur to those skilled in the art. Accordingly, all such variations and modifications are included within the intended scope of the invention.

We claim:

1. A method for arranging a fuzzy controller or a system of interlinked fuzzy controllers having at least two input variables and an output variable and having existing input membership functions with which truth values of linguistic values for the input variables are determined, a control mechanism in which truth values for the output variable are determined from the truth values for the input variables, and output membership functions with which the values of the output variable are determined from the truth values for the output variable comprising the steps of:

defining a number of classes over the value range of the input variables;

registering value combinations of the input variables and of the output variable in a learning phase;

altering or removing classes and/or generating new classes as a function of registered value combinations of the input variables and of the output variable; and generating adapted membership functions and adapted rules of the control mechanism as a function of the defined number of classes.

2. A method according to claim 1 wherein the number and the position of the classes are defined as a function of the existing input membership functions.

3. A method according to claim 2 wherein the classes are defined at reference points of the input measurement functions.

4. A method according to claim 1 wherein, for an initial portion of the value range of the input variables, one value of the output variable is defined.

5. A method according to claim 1 wherein the value combinations of the input variables and of the output variable which are recorded are preselected.

6. A method according to claim 1 wherein a new class is generated whenever a value combination of the input variables and of the output variables occurs which does not fall into a defined class.

7. A method according to claim 1 including the steps of:

defining areas in the value range of the input variables around the defined classes in which areas no new classes are formed;

distributing to the adjacent classes in accordance with a weighting the value combinations of the input variables and of the output variable which occur and which fall into one of the areas around the defined classes in which no new classes are formed; and altering the width of the areas surrounding the defined classes in accordance with the hits of value combinations thus generated so that free areas are produced in which, if a value combination arrives, a new class may be formed.

8. A method according to claim 1 comprising the steps of:

removing a defined class when a new class is generated;

distributing the value combinations of the input variables and of the output variable already assigned to the removed class to the adjacent classes; and altering the adjacent classes in accordance with the value combinations of the input variables and of the output variable distributed to them.

9. A method according to claim 1 wherein, following the adaptation of the classes, each class forms at least one reference point of a set of the input membership function.

10. A method according to claim 1 wherein the rules of the fuzzy controller are formed by the points of intersection of the classes.

11. A method according to claim 1 wherein the output value of the points of intersection of the classes forms a reference point of the sets of the output membership functions.

12. A method according to claim 1 wherein, in areas of the value range of the input variables for which no value combinations of the input variables and of the output variable are registered during a learning phase and/or which have classes with extremely prominent value combinations, a local and/or global interpolation is carried out.

13. A method according to claim 1 wherein the value combinations of the input variables and of the output variable are measured during an operator operation.

14. A method for arranging a fuzzy controller or a system of interlinked fuzzy controllers having at least two input variables and an output variable, and having input membership functions with which truth values of linguistic values for the input variables are determined, a control mechanism in which truth values for the output variable are determined from the truth values for the input variables, and output membership functions with which the values of the output variable are determined from the truth values for the output variable comprising the steps of:

determining value ranges for the input variables;

defining a number of classes over the value ranges for the input variables;

registering value combinations of the input variables and of the output variable occurring in a learning phase;

altering the defined classes and/or removing or adding new classes as a function of the registered value combinations of the input variables and of the output variables; and generating membership functions and rules of the control mechanism as a function of the defined classes.

15. A method according to claim 14 including the step of:

preselecting the value combinations of the input variables of the output variable which are recorded.

16. A method according to claim 14 including the step of:

defining, for an initial area of the value range, a constant value of the output variable.

17. A method according to claim 14 wherein a new class is generated whenever a value combination of the input variables and of the output variable occurs which does not fall into an existing class.

18. A method according to claim 14 including the steps of:

defining areas in the value range of the input variables around the defined classes in which areas no new classes are formed;

distributing the value combinations of the input variables and of the output variable which occur and which fall into one of the areas around the classes but in none of the classes to the adjacent classes in accordance with a weighting;

altering the width of the areas surrounding the classes in accordance with the hits of value combinations thus generated, producing free areas; and forming a new class in the free area when a value combination arrives.

19. A method according to claim 14 including the steps of:

removing an existing class when a new class is generated;

distributing the value combinations of the input variables and of the output variable assigned to a removed class to the adjacent classes; and altering the adjacent classes in accordance with the value combinations of the input variables and output variable assigned to them.

20. A method according to claim 14 wherein each class forms at least one reference point of a set of the input membership function.

21. A method according to claim 14 wherein the rules of the control mechanism are formed by the points of intersection of the classes.

22. A method according to claim 14 wherein the output value of the points of intersection of the classes forms a reference point of the sets of the output membership function.

23. A method according to claim 14 including the steps of:

carrying out a local or global interpolation in areas of the value range of the input variables for which no value combinations of the input variables and of the output variable are registered during the learning phase and/or which have classes with extremely prominent value combinations.

24. A method according to claim 14 wherein the value combinations of the input variables and of the output variable are registered by an operator.

25. A fuzzy controller arrangement comprising:

at least one fuzzy controller having at least two input variables and an output variable and having membership functions with which truth values of linguistic values for the input variables are determined;

a control unit in which truth values for the output variable are determined from the truth value for the input variables and in which output membership functions with which the values of the output variable are determined from the truth values for the output variable;

means for defining a number of classes over the value range of the input variable;

means for registering value combinations of the input variable and of the output variable in a learning phase;

means for altering or removing classes or generating new classes as a function of registered value combinations of the input variables and the output variable; and means for generating adapted rules of the control mechanism as a function of the defined number of classes.

* * * * *